US012183359B2

(12) United States Patent
Morton et al.

(10) Patent No.: US 12,183,359 B2
(45) Date of Patent: Dec. 31, 2024

(54) INPUT SELECTION FOR WIND NOISE REDUCTION ON WEARABLE DEVICES

(71) Applicant: Bose Corporation, Framingham, MA (US)

(72) Inventors: Douglas George Morton, Southborough, MA (US); Olivia Montana Canavan, Natick, MA (US); Yang Liu, Boston, MA (US)

(73) Assignee: Bose Corporation, Framingham, MA (US)

( * ) Notice: Subject to any disclaimer, the term of this patent is extended or adjusted under 35 U.S.C. 154(b) by 219 days.

(21) Appl. No.: 17/823,264

(22) Filed: Aug. 30, 2022

(65) Prior Publication Data

US 2024/0071404 A1 Feb. 29, 2024

(51) Int. Cl.
*G10L 21/0232* (2013.01)
*G10K 11/178* (2006.01)
(Continued)

(52) U.S. Cl.
CPC .... *G10L 21/0232* (2013.01); *G10K 11/17823* (2018.01); *G10K 11/17873* (2018.01); *H04R 1/1016* (2013.01); *H04R 1/1083* (2013.01); *H04R 1/406* (2013.01); *H04R 3/005* (2013.01); *G10K 2210/1081* (2013.01);
(Continued)

(58) Field of Classification Search
CPC ...... G10L 21/0232; G10L 2021/02166; G10K 11/17823; G10K 11/17873; G10K 2210/1081; G10K 2210/3027; H04R 1/1016; H04R 1/1083; H04R 1/406;
(Continued)

(56) References Cited

U.S. PATENT DOCUMENTS

2012/0253798 A1 10/2012 Walters et al.
2019/0005977 A1 1/2019 Olsson
2022/0310107 A1 * 9/2022 Liu ......................... G10L 25/51

FOREIGN PATENT DOCUMENTS

EP 2765787 A1 8/2014

OTHER PUBLICATIONS

Korhonen; "Wind noise management in hearing aids"; Sep. 24, 2021; Seminars in Hearing; Thieme Newyork-Stuggart (Year: 2021).*
(Continued)

*Primary Examiner* — David L Ton
(74) *Attorney, Agent, or Firm* — Bond, Schoeneck & King, PLLC

(57) ABSTRACT

A wind noise reduction system including a beamformer, a comparator, and a voice mixer is provided. The beamformer may be an MVDR beamformer, and generates a beamformed signal based on a first microphone signal and a second microphone signal. The comparator generates a comparison signal based on the beamformed signal and a wind microphone signal. The comparison signal may be further based on a beamformed energy level of the beamformed signal and a wind energy level of the wind microphone signal. The voice mixer generates an output voice signal based on the beamformed signal, the wind microphone signal, and the comparison signal. The wind noise reduction system may further include a wind microphone corresponding to the wind microphone signal. The wind microphone may be arranged on a portion of a wearable audio device configured to be seated in a concha of a wearer.

17 Claims, 8 Drawing Sheets

(51) Int. Cl.
*H04R 1/10* (2006.01)
*H04R 1/40* (2006.01)
*H04R 3/00* (2006.01)
*G10L 21/0216* (2013.01)

(52) U.S. Cl.
CPC ................ *G10K 2210/3027* (2013.01); *G10L 2021/02166* (2013.01); *H04R 2410/01* (2013.01); *H04R 2410/07* (2013.01); *H04R 2460/01* (2013.01)

(58) Field of Classification Search
CPC ................ H04R 3/005; H04R 2410/01; H04R 2410/07; H04R 2460/01
See application file for complete search history.

(56) References Cited

OTHER PUBLICATIONS

Wind noise management in hearing aids (Year: 2021).*
International Search Report and the Written Opinion of the International Searching Authority, PCT Application No. PCT/US2023/031179, dated Feb. 5, 2024, pp. 1-18.

* cited by examiner

INPUT SELECTION FOR WIND NOISE REDUCTION ON WEARABLE DEVICES

FIELD OF THE DISCLOSURE

The present disclosure is generally directed to input selection for wind noise reduction on wearable audio devices.

BACKGROUND

One important aspect of a wearable audio device is the ability to capture voice audio from the wearer. Whether the captured speech is in the context of a voice call with another person, or entering a voice audio command in an electronic system, the clarity of the voice audio is important to the use of the device. Most wearable audio devices utilize one or more embedded microphones to capture the voice audio. However, certain devices, such as earbuds, contain microphones which are exposed to the external environment. These microphones are particularly vulnerable to wind noise drowning out captured voice audio.

The wind noise issue may be exacerbated by wearable audio devices utilizing minimum variance distortionless response (MVDR) beamforming. Beamforming allows the audio sensors of the device to focus audio capture on particular spatial regions, such as the regions around the mouth of the wearer. MVDR beamforming is often preferred due to its high performance in terms of clarity and naturalness, particularly in areas with some degree of diffused noise, such as a cafeteria setting. However, the characteristics of MVDR beamforming can cause significant amplification of wind noise, sometimes to the point of overwhelming any captured voice audio. Accordingly, there is a need for an audio processing system capable of reducing wind noise on wearable audio devices.

SUMMARY

This disclosure is generally directed to input selection for wind noise reduction on wearable audio devices.

Generally, in one aspect, a wind noise reduction system is provided. The wind noise reduction system includes a beamformer. The beamformer is configured to generate a beamformed signal. The beamformed signal is generated based on a first microphone signal and a second microphone signal. The beamformer may be a minimum variance distortionless response (MVDR) beamformer.

The wind noise reduction system further includes a comparator. The comparator is configured to generate a comparison signal. The comparison signal is generated based on the beamformed signal and a wind microphone signal. The comparison signal may be further based on a beamformed energy level of the beamformed signal and a wind energy level of the wind microphone signal.

The wind noise reduction system further includes a dynamic voice mixer. The dynamic voice mixer is configured to generate an output voice signal. The output voice signal is generated based on the beamformed signal, the wind microphone signal, and the comparison signal. According to an example, the output voice signal may a blend of the beamformed signal and the wind microphone signal. A ratio of the wind microphone signal to the beamformed signal in the output voice signal may correspond to the comparison signal. Further, the ratio of the wind microphone signal to the beamformed signal in the output voice signal may be frequency dependent. According to another example, the output voice signal may correspond to the wind microphone signal at a frequency range of 200 Hz to 2 kHz.

According to an example, the wind noise reduction system may further include a first microphone corresponding to the first microphone signal. The wind noise reduction system may further include a second microphone corresponding to the second microphone signal. The wind noise reduction system may further include a wind microphone corresponding to the wind microphone signal. The wind microphone may be arranged on a portion of a wearable audio device configured to be seated in a concha of a wearer. Further, the wind microphone may face a floor of a concha of a wearer during use.

According to an example, the first microphone signal, the second microphone signal, and the wind microphone signal may be frequency domain signals. Alternatively, the first microphone signal, the second microphone signal, and the wind microphone signal may be time domain signals.

According to an example, the wind noise reduction system may further include an equalizer. The equalizer may be configured to filter the beamformed signal prior to the beamformed signal being received by the comparator and the dynamic voice mixer.

According to an example, the wind noise reduction system may further include a high pass filter. The high pass filter may be configured to filter the beamformed signal prior to the beamformed signal being received by the dynamic voice mixer.

According to an example, the wind noise reduction system may further include a feedforward noise cancellation controller for performing feedforward noise cancellation. The feedforward noise cancellation controller receives an input corresponding to the wind microphone signal.

Generally, in another aspect, a wearable audio device is provided. The wearable audio device includes a first microphone. The first microphone is configured to generate a first microphone signal.

The wearable audio device further includes a second microphone. The second microphone is configured to generate a second microphone signal.

The wearable audio device further includes a wind microphone. The wind microphone corresponds to a wind microphone signal. The wind microphone may be arranged on a portion of the wearable audio device configured to be inserted in a concha of a wearer.

The wearable audio device further includes a beamformer. The beamformer is configured to generate a beamformed signal. The beamformed signal is generated based on the first microphone signal and the second microphone signal.

The wearable audio device further includes a comparator. The comparator is configured to generate a comparison signal. The comparison signal is generated based on the beamformed signal and the wind microphone signal.

The wearable audio device further includes a dynamic voice mixer. The dynamic voice mixer is configured to generate an output voice signal. The output voice signal is generated based on the beamformed signal, the wind microphone signal, and the comparison signal.

According to an example, the wearable audio device may be an earbud.

Generally, in another aspect, a method for reducing wind noise is provided. The method includes generating, via a beamformer, a beamformed signal based on a first microphone signal and a second microphone signal. The method further includes generating, via a comparator, a comparison signal based on the beamformed signal and a wind microphone signal. The method further includes generating, via a dynamic voice mixer, an output voice signal based on the beamformed signal, the wind microphone signal, and the comparison signal.

According to another example, the method may further include: (1) generating, via a first microphone, the first microphone signal; (2) generating, via a second microphone, the second microphone signal; and (3) generating, via a wind microphone arranged on a portion of a wearable audio device configured to be disposed in a concha of a wearer and facing a floor of the concha, the wind microphone signal.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

This disclosure generally relates to input selection for wind noise reduction on wearable audio devices. A wearable audio device captures spoken voice audio from a wearer via two microphones coupled to a beamformer, such as a minimum variance distortionless response (MVDR) beamformer. The wearable audio device also captures spoken voice audio via a wind microphone. The wind microphone is arranged on a portion of the wearable device configured to be seated in a concha of the wearer, such that the wind microphone faces a floor of the concha. Accordingly, the wind microphone will be shielded from wind noise by the concha and the structure of the ear of the wearer, and thus perform better in windy conditions than the beamformer. In particular, the wind microphone will generally outperform (in terms of characteristics such as signal to noise ratio (SNR) or noise floor level) the beamformer in the 200 Hz to 2 kHz frequency range.

The energy level of a beamformed signal generated by the beamformer is compared to the energy level of a wind microphone signal captured by the wind microphone. A dynamic voice mixer generates an output voice signal by switching between (or blending) the beamformed signal and the wind microphone signal based on the energy level comparison. If the energy level of the beamformed signal is higher than the energy level of the wind microphone signal, windy conditions are present, and at least a portion of the output voice signal will correspond to the wind microphone signal. Alternatively, if the energy level of the beamformed signal is lower than the energy level of the wind microphone signal, non-windy conditions are present, and at least a portion of the output voice signal will correspond to the beamformed signal.

Figure 1:
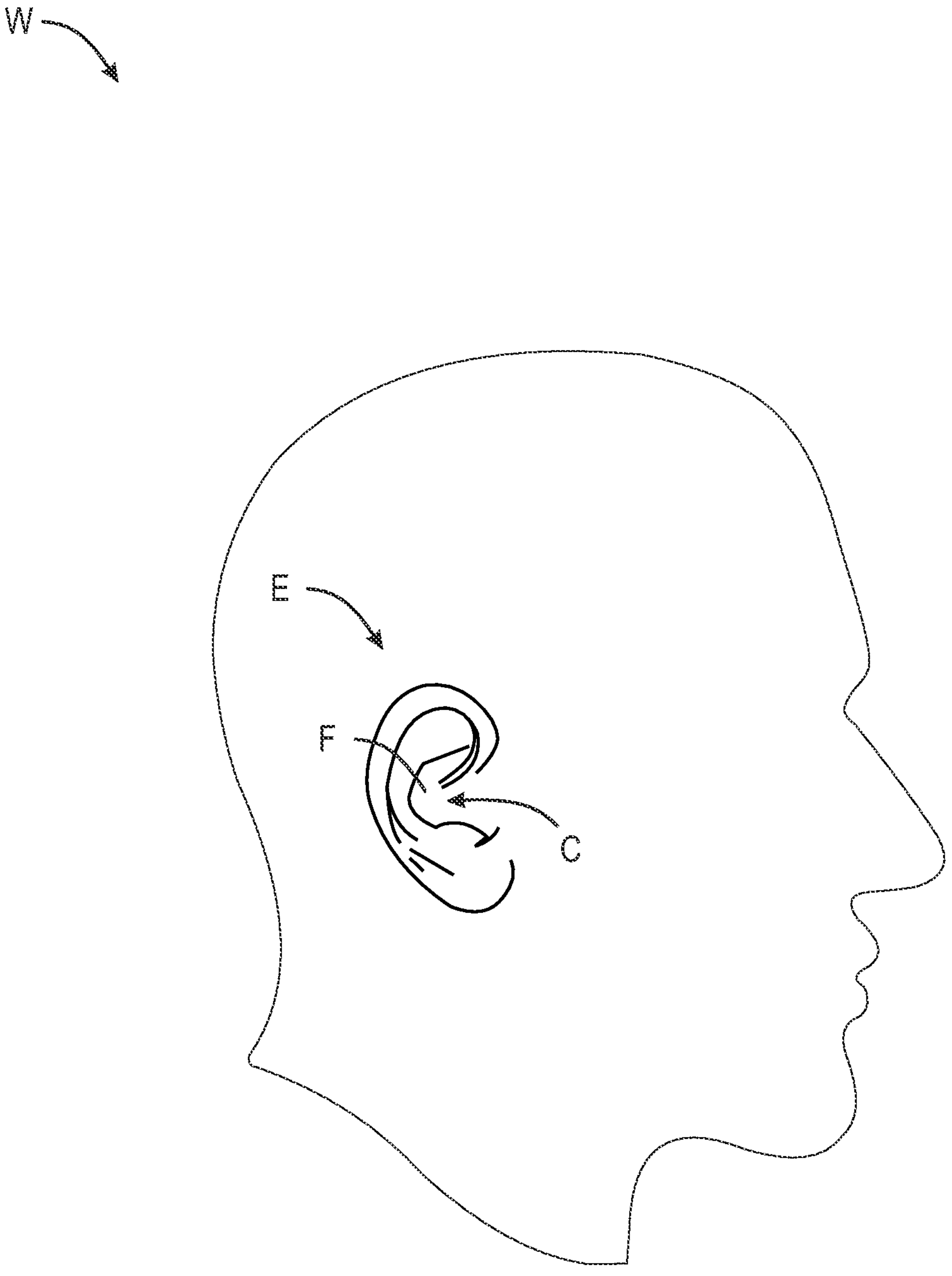
FIG. 1 is an illustration of a wearer of a wearable audio device.
Figure 2:
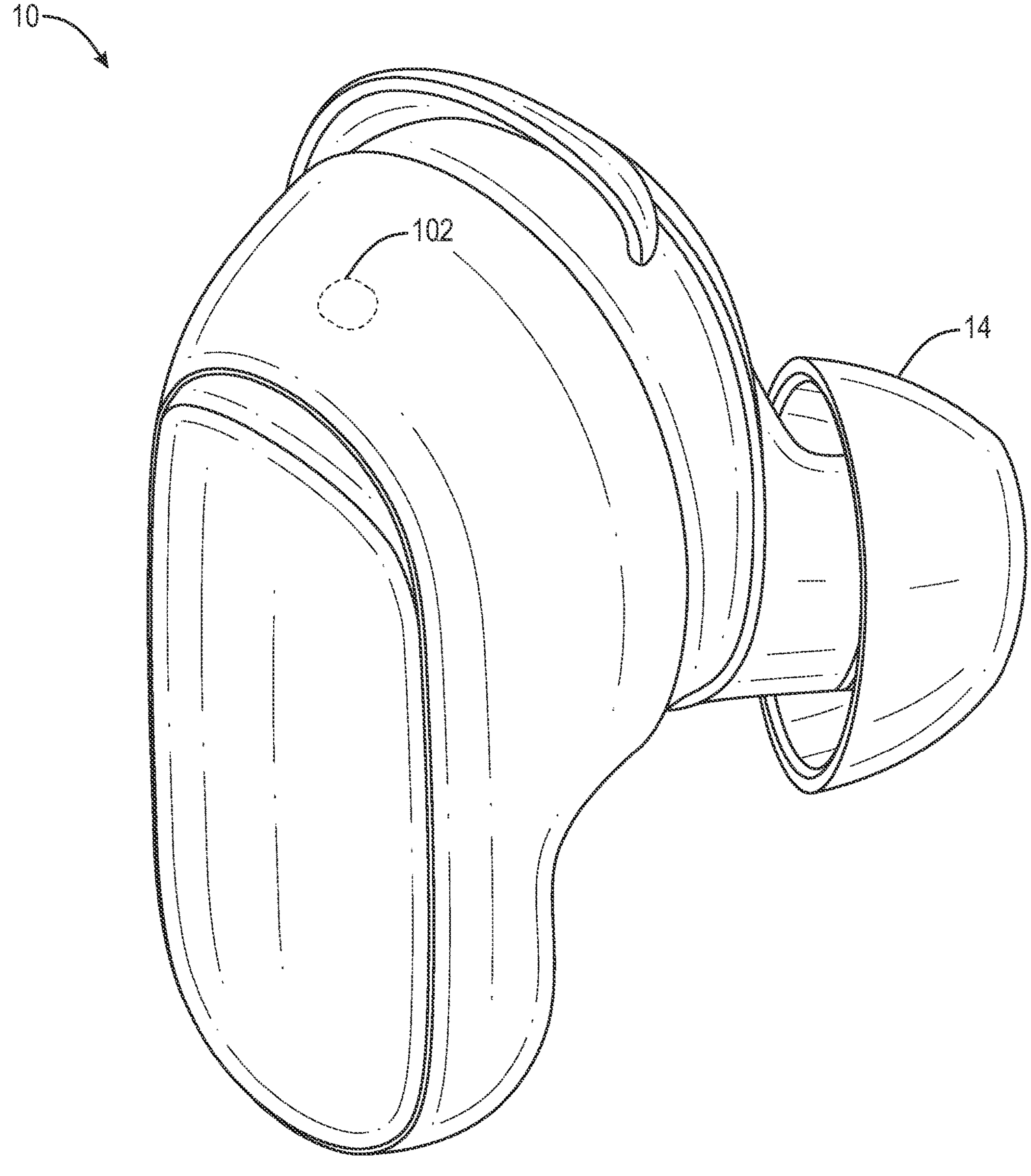
FIG. 2 is an isometric view of a wearable audio device, according to aspects of the present disclosure.

FIG. 1 is an illustration of a wearer W of a wearable audio device 10 (see FIG. 2). In particular, FIG. 1 illustrates the location of a concha C of an ear E of the wearer W. The inner portion of the concha C may be referred to as a floor F. As will be demonstrated in subsequent figures, a portion of the wearable audio device 10 will be seated in the concha C, such that the portion faces the floor F. Notably, this portion of the wearable audio device 10 will be shielded from wind noise in windy conditions by the structure of the ear E.

FIG. 2 is an isometric view of a wearable audio device 10 embodied as an earbud. In this example, the wearable audio device 10 includes an ear tip 14 to be inserted into an ear canal of the wearer W. The wearable audio device 10 also includes a first microphone 102. The first microphone 102 is arranged on the surface of the wearable audio device 10, such that the first microphone 102 generally faces away from the wearer W when the ear tip 14 is inserted into the ear canal. The first microphone 102 may be any microphone generally configured to capture spoken voice audio from the wearer W, such as an omnidirectional microphone.

Figure 3:
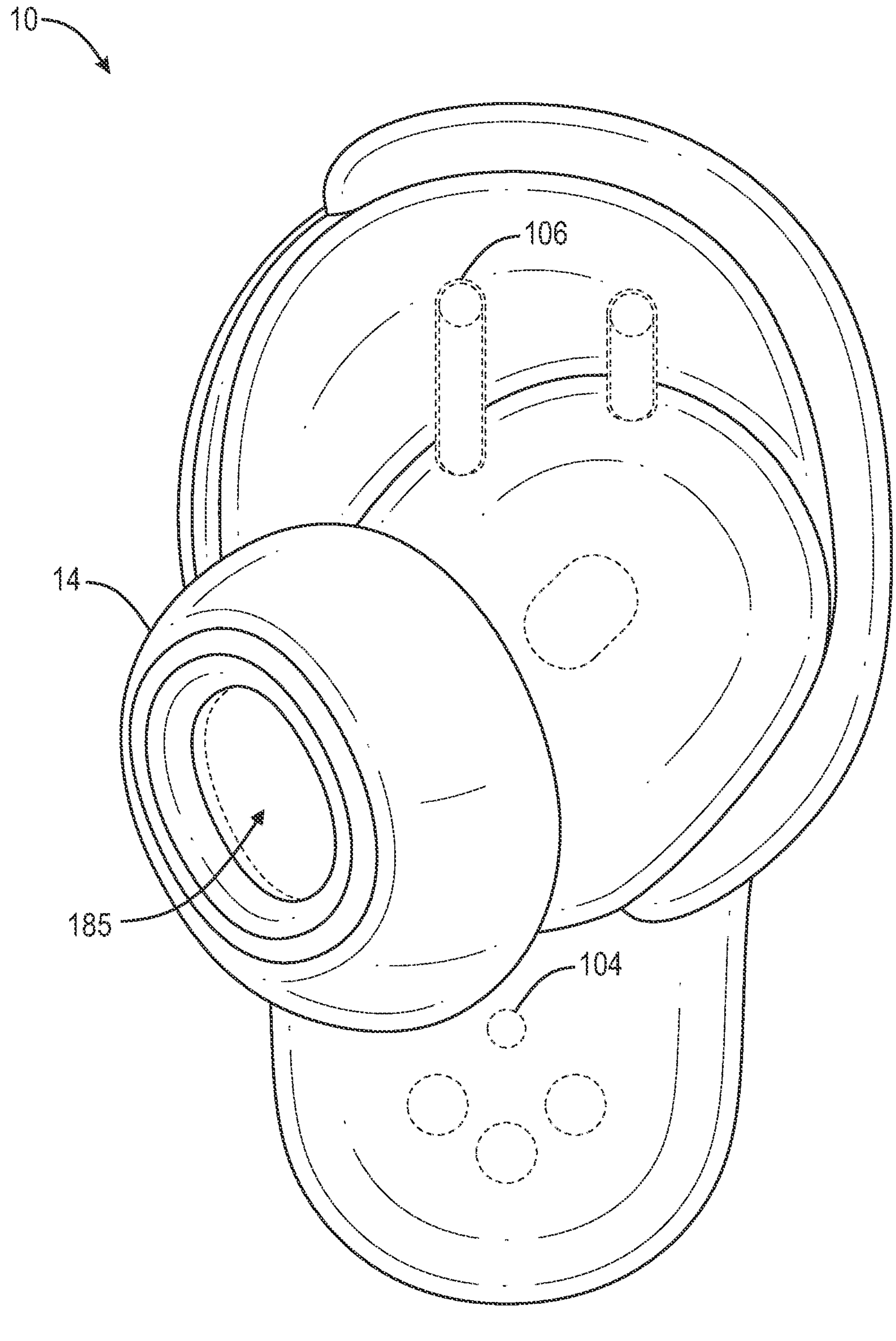
FIG. 3 is a further isometric view of the wearable audio device of FIG. 2, according to aspects of the present disclosure.

FIG. 3 is a front view of the wearable audio device 10 of FIG. 2. As shown in FIG. 3, the wearable audio device 10 includes an acoustic transducer 185 arranged within the ear tip 14. The acoustic transducer 185 is configured to convert electrical signals into audio for playback to the wearer W. The wearable audio device 10 also includes a second microphone 104. The second microphone 104 is arranged on a rear surface of the wearable audio device, such that the second microphone 104 generally faces towards to wearer when the ear tip 14 is inserted in the ear canal. As can be seen in FIGS. 2 and 3, the first and second microphone 102, 104 are each exposed to the external environment, making each microphone 102, 104 susceptible to wind noise.

As with the first microphone 102, the second microphone 104 may be any microphone generally configured to capture spoken voice audio from the wearer W, such as an omnidirectional microphone. Further, as will be described in more detail below, the first and second microphones 102, 104 may be used with a beamformer 114 (see FIGS. 5 and 6) to capture spoken voice audio from a specific spatial region proximate to the wearer W. In a preferred example, the beamformer 114 is an MVDR beamformer.

As used herein, the term "beamformer" generally refers to a filter or filter array used to achieve directional signal transmission or reception. In the examples described in the present application, the beamformers combine audio signals received by multiple audio sensors (such as microphones and accelerometers) to focus on a desired spatial region, such as the region around the wearer's mouth. While different types of beamformers utilize different types of filtering, beamformers generally achieve directional reception by filtering the received signals such that, when combined, the signals received from the desired spatial region constructively interfere, while the signals received from the undesired spatial region destructively interfere. This interference results in an amplification of the signals from the desired spatial region, and rejection of the signals from the undesired spatial region. The desired constructive and destructive interference is generally achieved by controlling the phase and/or relative amplitude of the received signals before combining. The filtering may be implemented via one or more integrated circuit (IC) chips, such as a field-programmable gate array (FPGA). The filtering may also be implemented using software.

Figure 4:
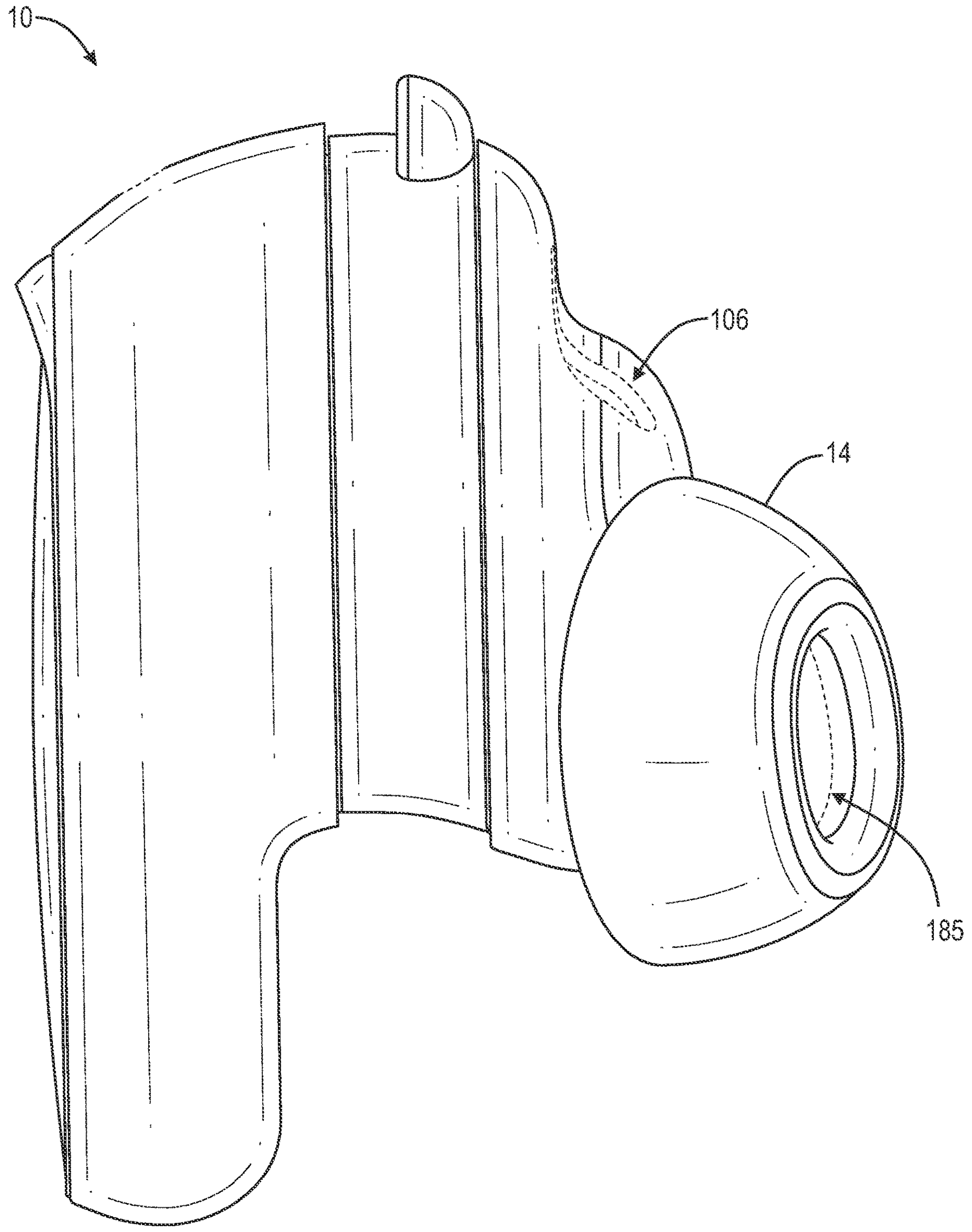
FIG. 4 is a further isometric view of the wearable audio device of FIGS. 2 and 3, according to aspects of the present disclosure.

The wearable audio device 10 also includes a wind microphone 106. The wind microphone 106 is positioned on a portion of the wearable audio device 10 configured to be seated in the concha C of the wearer W such that the wind microphone 106 faces the floor F of the concha C. By positioning the wind microphone 106 within the concha C, the wind microphone 106 is effectively shielded from wind noise. Thus, in windy conditions, it may be preferable to use spoken voice audio captured by the wind microphone 106 rather than the first or second microphone 102, 104. In some examples, the wind microphone 106 may also be used as an input to a feedforward noise cancellation system. In a feedforward noise cancellation system, audio captured by the wind microphone may be used to remove unwanted noise from audio played for the wearer W via the acoustic transducer 185. A further (left side) view of the wearable audio device 10, showing the wind microphone 106, ear tip 14, and acoustic transducer 185 is shown in FIG. 4. In some examples, the wind microphone 106 may be an identical or similar make, model, or type of microphone as the first or second microphone 102, 104. Thus, the wind microphone 106 may be an omnidirectional microphone.

Figure 5:
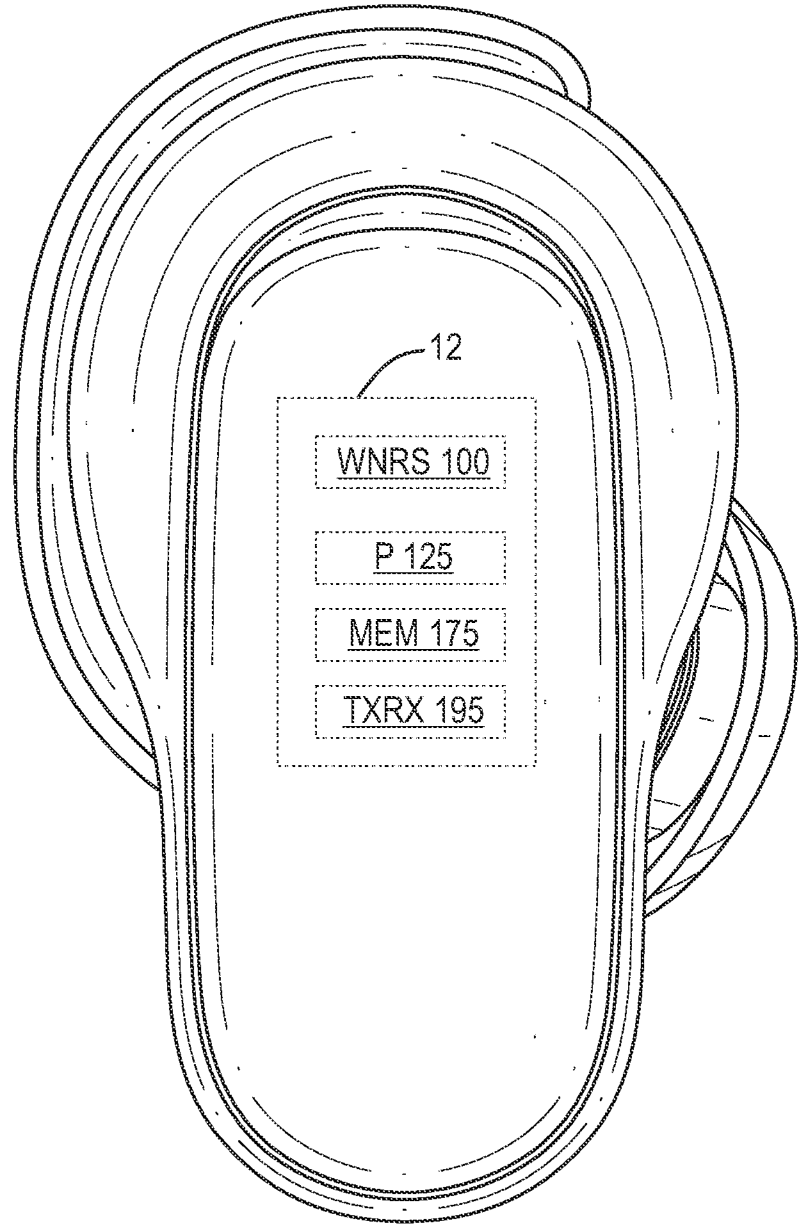
FIG. 5 is a further isometric view of the wearable audio device of FIGS. 2-4, according to aspects of the present disclosure.

FIG. 5 is a further view of the wearable audio device 10. FIG. 5 depicts internal circuitry 12 of the wearable audio device 10. The internal circuitry 12 includes a wind noise reduction system 100 (shown in greater detail in FIGS. 6 and 7), a processor 125, a memory 175, and a transceiver 195. The processor 125 may be used to execute aspects of the wind noise reduction system 100, such as a beamformer 114, an equalizer 130, a high pass filter 132, energy detectors 138, 140, a comparator 118, and/or a voice mixer 122 (see FIGS. 6 and 7). The memory 175 may be configured to store data related to various aspects of the wind noise reduction system 100, such as programmable filter weights for a beamformer 114, an equalizer 130, or a high pass filter 132 (see FIGS. 6 and 7). The transceiver 195 may be configured to transmit or receive data related to the wind noise reduction system 100. In some examples, the transceiver 195 transmits an output voice signal 124 (see FIGS. 6 and 7) to a peripheral device, such as a smartphone, to execute a telephone call. The transceiver 195 may also receive data corresponding to settings of the various aspects of the wind noise reduction system 100, such as programmable filter weights for the beamformer 114, the equalizer 130, or the high pass filter 132.

Figure 6:
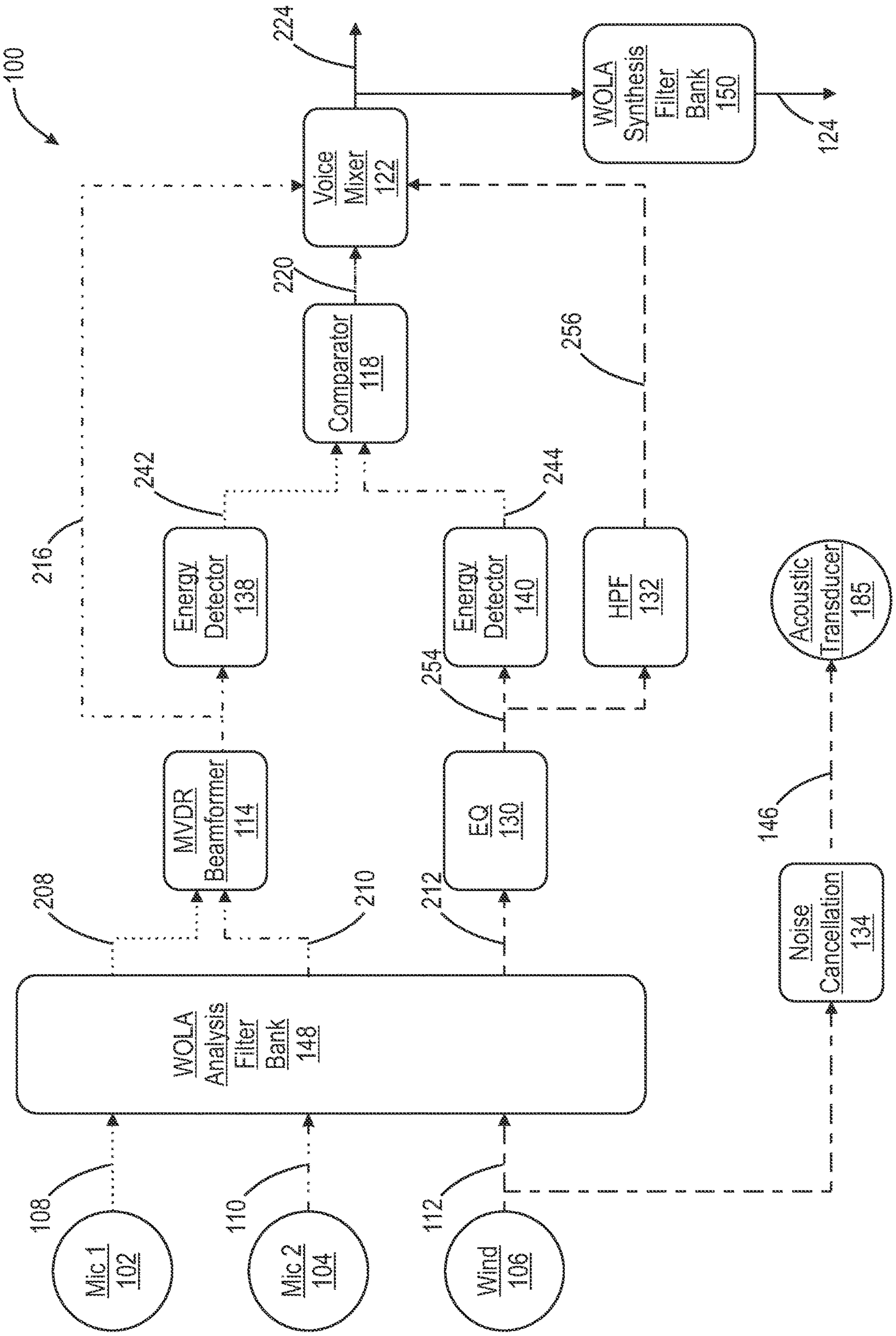
FIG. 6 is a functional block diagram of a frequency domain wind noise reduction system, according to aspects of the present disclosure.

FIG. 6 illustrates a functional block diagram of a frequency domain version of a wind noise reduction system 100. The frequency domain wind noise reduction system 100 may be implemented to capture spoken voice audio from a wearer W of a wearable audio device 10 (such as an earbud, see FIGS. 2-5) for use in a telephone call or related application. Accordingly, the frequency domain wind noise reduction system 100 generates an output voice signal 124. This output voice signal 124 (or a further processed version of the output voice signal 124) may be wirelessly transmitted, via a transceiver 195 (see FIG. 5) to a peripheral device, such as a smartphone and/or sent to acoustic transducer 185 to provide a sidetone to the wearer W of the wearable audio device 10.

As illustrated in FIG. 6, the wind noise reduction system 100 includes three microphones disposed on the wearable audio device 10 to capture spoken voice audio, a first microphone 102 (for example, as depicted in FIG. 2), a second microphone 104 (for example, as depicted in FIG. 3), and a wind microphone 106 (for example, as depicted in FIGS. 3 and 4). As previously described, the wind microphone 106 is positioned on a portion of the wearable audio device 10 configured to be seated in the concha C (see FIG. 1) of the wearer W such that the wind microphone 106 faces the floor F (see FIG. 1) of the concha C. Thus, the wind microphone 106 is shielded from wind noise, while the first and second microphones 102, 104 are exposed to wind noise due to their placement outside of the concha C. Further, the wind microphone 106 may also be used in feedforward noise cancellation systems.

Each of the microphones 102, 104, 106 generates time domain electrical signals corresponding to the captured voice audio. The first microphone 102 generates a first microphone signal 108, the second microphone 104 generates a second microphone signal 110, and the wind microphone 106 generates a wind microphone signal 112. The first microphone signal 108, the second microphone signal 110, and the third microphone signal 112 are then converted to the frequency domain by a Weighted, Overlap, and Add (WOLA) analysis filter bank.

The first and second frequency domain second microphone signals 208, 210 are then provided to a beamformer 114. As previously described, the beamformer 114 is used to achieve directional audio capture using the first and second microphones 102, 104. The beamformer 114 uses the first and second frequency domain microphone signals 208, 210 to generate a beamformed signal 216. In the example of FIG. 6, the beamformer 114 is an MVDR beamformer. The algorithm employed by the MVDR beamformer minimizes the power of the noise captured by the first and second microphones 102, 104 while keeping the desired signal distortionless. In doing so, MVDR beamformers can provide improved SNR performance over other beamformers (such as delay and sum beamformers) in diffused noise environments, such as a cafeteria-type setting. However, in certain environments, such as high wind environments, MVDR beamformers may amplify noise instances as much as 10 to 20 dB at certain frequencies, thus negatively impacting SNR performance of resultant beamformed signals.

The frequency domain wind microphone signal 212 is provided to equalizer 130. The equalizer 130 is configured to attenuate portions of the frequency domain wind microphone signal 212 such that in a quiet, non-windy environment, the energy level of an equalized wind microphone signal 254 equals the energy level of the beamformed signal 216 for more accurate wind detection. One or more filter weights of the equalizer 130 may be programmable and/or dynamic.

The wind noise reduction system 100 then determines the energy levels of the beamformed signal 216 and the equalized wind microphone signal 254. A first energy detector 138 receives the beamformed signal 216. The first energy detector 138 analyzes the beamformed signal 216 using smooth energy envelope analysis to generate a beamformed energy level signal 242 corresponding to the energy level of the beamformed signal 216. Similarly, a second energy detector 140 receives the equalized wind microphone signal 254. The second energy detector 140 analyzes the equalized wind microphone signal 254 using smooth energy envelope analysis to generate a wind microphone energy level signal 244 corresponding to the energy level of the equalized wind microphone signal 254.

The beamformed energy level signal 242 and the wind microphone energy level signal 244 are then provided to a comparator 118. The comparator 118 generates a comparison signal 220 indicating whether the beamformed energy level signal 242 or the wind microphone energy level signal 244 is greater. In some examples, the comparison signal 220 may also indicate the degree of difference between the beamformed energy level signal 242 and the wind microphone energy level signal 244. In further examples, the comparison signal 220 may be frequency dependent, indicative of fluctuating energy levels over frequency. In even further examples, the comparator 118 may be focused on comparing the energy levels in a defined frequency range, such as 200 Hz and 2 kHz. The frequency range of 200 Hz and 2 kHz is an example of a frequency range where the wind microphone signal 112 may outperform (in terms of characteristics such as SNR or noise floor level) the beamformed signal 216 in windy conditions.

The equalized wind microphone signal 254 is then provided to a high pass filter 132. The high pass filter 132 is configured to remove or attenuate low frequency noise in windy conditions. One or more filter weights of the high pass filter 132 may be programmable and/or dynamic. Notably, for accurate energy level comparisons, a high pass filter is not applied to the equalized wind microphone signal 254 received by the second energy detector 140. Further, a high pass filter is not applied to the beamformed signal 216 to preserve low frequency aspects in non-windy conditions.

The comparison signal 220, the beamformed signal 216, and the filtered wind microphone signal 256 are provided to a voice mixer 122. The voice mixer 122 may function as a crossfader to generate a frequency domain output voice signal 224 by switching between or blending the beamformed signal 216 and the filtered wind microphone signal 256 based on the comparison signal 220. As the comparison signal 220 will change based on the beamformed energy level signal 242 and the wind microphone energy level signal 244, the switching or blending settings of the voice mixer 122 will change accordingly. Thus, the voice mixer 122 can be considered to be a dynamic voice mixer.

In one example, the voice mixer 122 is configured to switch back-and-forth between the beamformed signal 216 and the filtered wind microphone signal 256 to generate the output voice signal 224. If the comparison signal 220 indicates that the energy level of the beamformed signal 216 is significantly higher than the energy level of the equalized wind microphone signal 254 (corresponding to windy conditions), the frequency domain output voice signal 224 may correspond to the filtered wind microphone signal 256. If the comparison signal 220 indicates that the energy level of the beamformed signal 216 decreases to be significantly less than the energy level of the equalized wind microphone signal 254 (corresponding to non-windy conditions), the frequency domain output voice signal 224 may switch to correspond to the beamformed signal 216. In some examples, this switching may be limited to frequency ranges where the wind microphone 106 (positioned in the concha C of the wearer W) performs significantly better than the beamformer 114 in windy conditions. By dynamically switching back-and-forth, the voice mixer 122 adapts the frequency domain output voice signal 224 to use the beamformed signal 216 in non-windy conditions and the frequency domain wind microphone signal 212 in windy conditions for improved performance over just the beamformed signal 216 or the frequency domain wind microphone signal 212 over the entire applicable frequency range.

In one example, this switching may be confined to a defined frequency range. For example, if the energy level of the beamformed signal 216 is significantly higher than the energy level of the equalized wind microphone signal 254 (indicating windy conditions), the frequency domain output signal 224 may be configured to correspond to the filtered wind microphone signal 256 below 2 kHz, while corresponding to the beamformed signal 216 above 2 kHz, as the impact of wind noise on the beamformed signal is most severe below 2 kHz.

In other examples, rather than switching between the beamformed signal 216 and the filtered wind microphone signal 256, the frequency domain output voice signal 224 may be a blend of the two, analogous to a blended crossfade. If the comparison signal 220 indicates the energy level of the beamformed signal 216 is higher than the energy level of the equalized wind microphone signal 254 (indicating windy conditions) by a ratio of 2 to 1, the frequency domain output voice signal 224 may be a blend of the beamformed signal 216 and the equalized wind microphone signal 254 at a ratio of 1 to 2. As with the previous examples, this blend of the beamformed signal 216 and the filtered wind microphone signal 256 may be confined to a defined frequency range within the frequency domain output voice signal 224, such as below 2 kHz. In some examples, the ratio of the beamformed signal 216 to the filtered wind microphone signal 256 may vary over frequency.

Once generated, the frequency domain output voice signal 224 may be provided to additional circuitry for further processing in the frequency domain. Alternatively, the frequency domain output voice signal 224 may be converted into the time domain by a WOLA synthesis filter bank 150. The time domain output voice signal 124 may then be further processed before being transmitted, via a transceiver 195, to a peripheral device, such as a smartphone, for use in a telephone call or related application.

Aside from wind noise reduction, the (time domain) wind microphone signal 112 may also be used for feedforward noise cancellation to reduce noise played back to the wearer W via the acoustic transducer 185. The wind microphone signal 112 may be provided to a feedforward noise cancellation controller 134. The feedforward noise cancellation controller 134 then generates, based on the wind microphone signal 112, an anti-noise signal 146 which is provided to the acoustic transducer 185 to cancel out noise captured by the wind noise microphone 106, such as audible noise at the concha C of the wearer W.

Figure 7:
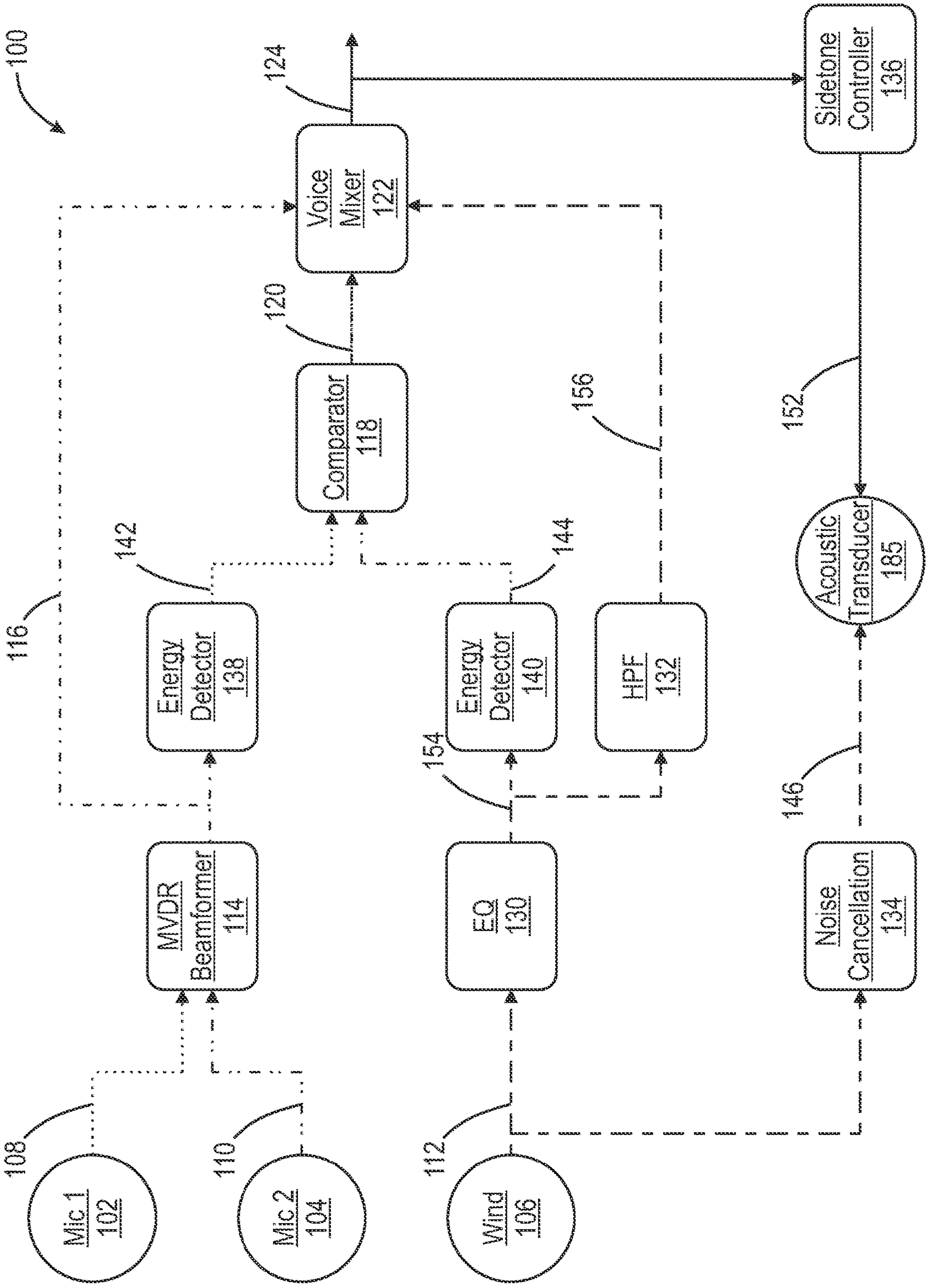
FIG. 7 is a functional block diagram of a time domain wind noise reduction system, according to aspects of the present disclosure.

FIG. 7 illustrates a time domain variation of FIG. 6. In FIG. 7, the wind noise cancellation and feedforward noise cancellation are performed to provide an audible sidetone to the wearer W. A sidetone may be defined as audible feedback provided to the wearer W confirming proper operation of the wearable audio device 10. This audible feedback includes a small amount of the voice of the wearer W. Hearing this audible feedback allows the wearer W to confirm that the microphones 102, 104 of the wearable audio device 10 are operating properly, adjust their speaking level to an appropriate level, and/or confirm connectivity of a voice call or other connection. The use of sidetones may also provide additional benefits to the wearer W, such as increasing environmental audio transparency and enabling the wearer W to speak in a more natural voice. This sidetone processing is preferably performed in the time domain, as the frequency domain transformations of FIG. 6 introduce a degree of latency to the audio feedback, potentially reducing the effectiveness of the audio feedback.

In FIG. 7, the first and second microphone signals 108, 110 are provided to the beamformer 114 as time domain signals. Similarly, the wind microphone signal 112 is provided to the equalizer 130 as a time domain signal. Thus, the signals generated by the beamformer 114 (beamformed signal 116), the first and second energy detectors 138, 140 (beamformed energy level signal 142 and wind microphone energy level signal 144), the equalizer 130 (equalized wind microphone signal 154), the high pass filter 132 (filtered wind microphone signal 156), the comparator 118 (comparison signal 120), and ultimately the voice mixer 122 (output voice signal 124) are also time domain signals analogous to the frequency domain signals described with respect to FIG. 6. The time domain output voice signal 124 may be provided to additional circuitry for further processing in the time domain. Further, the time domain output voice signal 124 may also be provided to a sidetone controller 136. The sidetone controller 136 processes the time domain output voice signal 124 into a sidetone signal 152 for playback to the wearer W via the acoustic transducer 185. While the sidetone signal 152 is played back by the acoustic transducer 185, noise proximate to the concha C of the wearer W may be reduced by providing the anti-noise signal 146 to the acoustic transducer 185 as described with reference to FIG. 6.

Figure 8:
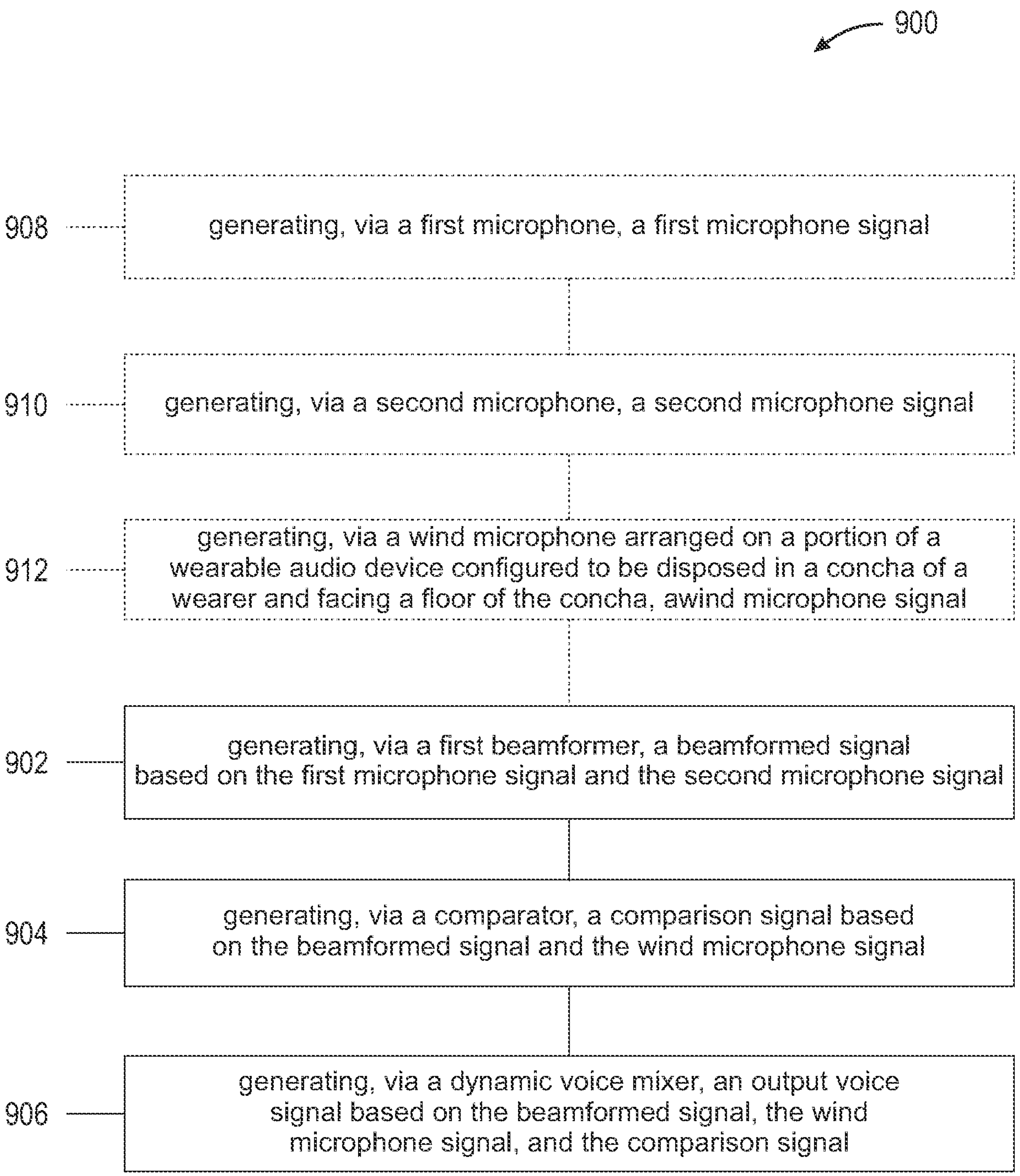
FIG. 8 is a flow chart of a method for reducing wind noise, according to aspects of the present disclosure.

FIG. 8 is a flow chart of a method 900 for reducing wind noise. The method 900 includes generating 902, via a beamformer, a beamformed signal based on a first microphone signal and a second microphone signal. The method 900 further includes generating 904, via a comparator, a comparison signal based on the beamformed signal and a wind microphone signal. The method 900 further includes generating 906, via a dynamic voice mixer, an output voice signal based on the beamformed signal, the wind microphone signal, and the comparison signal.

According to another example, the method 900 may further include the optional steps of: (1) generating 908, via a first microphone, the first microphone signal; (2) generating 910, via a second microphone, the second microphone signal; and (3) generating 912, via a wind microphone arranged on a portion of a wearable audio device configured to be disposed in a concha of a wearer and facing a floor of the concha, the wind microphone signal.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A wind noise reduction system comprising:

a beamformer configured to generate a beamformed signal based on a first microphone signal and a second microphone signal;

a comparator configured to generate a comparison signal based on the beamformed signal and a wind microphone signal, wherein the wind microphone signal corresponds to a wind microphone, and wherein (i) the wind microphone is arranged on a portion of a wearable audio device configured to be seated in a concha of a wearer and/or (ii) the wind microphone faces a floor of the concha of the wearer during use; and a dynamic voice mixer configured to generate an output voice signal based on the beamformed signal, the wind microphone signal, and the comparison signal.

2. The wind noise reduction system of claim 1, wherein the beamformer is a minimum variance distortionless response (MVDR) beamformer.

3. The wind noise reduction system of claim 1, wherein the comparison signal is further based on a beamformed energy level of the beamformed signal and a wind energy level of the wind microphone signal.

4. The wind noise reduction system of claim 1, wherein the output voice signal is a blend of the beamformed signal and the wind microphone signal.

5. The wind noise reduction system of claim 4, wherein a ratio of the wind microphone signal to the beamformed signal in the output voice signal corresponds to the comparison signal.

6. The wind noise reduction system of claim 5, wherein the ratio of the wind microphone signal to the beamformed signal in the output voice signal is frequency dependent.

7. The wind noise reduction system of claim 1, wherein the output voice signal corresponds to the wind microphone signal at a frequency range of 200 Hz to 2 kHz.

8. The wind noise reduction system of claim 1, further comprising:

a first microphone corresponding to the first microphone signal; and a second microphone corresponding to the second microphone signal.

9. The wind noise reduction system of claim 1, wherein the first microphone signal, the second microphone signal, and the wind microphone signal are frequency domain signals.

10. The wind noise reduction system of claim 1, wherein the first microphone signal, the second microphone signal, and the wind microphone signal are time domain signals.

11. The wind noise reduction system of claim 1, further comprising an equalizer configured to filter the beamformed signal prior to the beamformed signal being received by the comparator and the dynamic voice mixer.

12. The wind noise reduction system of claim 1, further comprising a high pass filter configured to filter the wind microphone signal prior to the wind microphone signal being received by the dynamic voice mixer.

13. The wind noise reduction system of claim 1, further comprising a feedforward noise cancellation controller for performing feedforward noise cancellation, wherein the feedforward noise cancellation controller receives an input corresponding to the wind microphone signal.

14. A wearable audio device, comprising:

a first microphone configured to generate a first microphone signal;

a second microphone configured to generate a second microphone signal;

a wind microphone corresponding to a wind microphone signal, wherein (i) the wind microphone is arranged on a portion of a wearable audio device configured to be seated in a concha of a wearer and/or (ii) the wind microphone faces a floor of the concha of the wearer during use;

a beamformer configured to generate a beamformed signal based on the first microphone signal and the second microphone signal;

a comparator configured to generate a comparison signal based on the beamformed signal and the wind microphone signal; and a dynamic voice mixer configured to generate an output voice signal based on the beamformed signal, the wind microphone signal, and the comparison signal.

15. The wearable audio device of claim 14, wherein the wearable audio device is an earbud.

16. A method for reducing wind noise, comprising:

generating, via a wind microphone, a wind microphone signal, wherein (i) the wind microphone is arranged on a portion of a wearable audio device configured to be disposed in a concha of a wearer and/or (ii) the wind microphone faces a floor of the concha of the wearer during use;

generating, via a first beamformer, a beamformed signal based on a first microphone signal and a second microphone signal;

generating, via a comparator, a comparison signal based on the beamformed signal and the wind microphone signal; and generating, via a dynamic voice mixer, an output voice signal based on the beamformed signal, the wind microphone signal, and the comparison signal.

17. The method of claim 16, further comprising:

generating, via a first microphone, the first microphone signal; and generating, via a second microphone, the second microphone signal.

* * * * *